(12) United States Patent
Herndon et al.

(10) Patent No.: US 6,657,339 B2
(45) Date of Patent: Dec. 2, 2003

(54) METHOD FOR SETTING GAPS IN HYDRODYNAMIC BEARINGS

(75) Inventors: Troy M. Herndon, San Jose, CA (US); Klaus D. Kloeppel, Watsonville, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/882,768

(22) Filed: Jun. 15, 2001

(65) Prior Publication Data

US 2002/0053845 A1 May 9, 2002

Related U.S. Application Data

(60) Provisional application No. 60/247,099, filed on Nov. 9, 2000.

(51) Int. Cl.[7] .................................................. H02K 7/08
(52) U.S. Cl. ........................................ 310/90; 310/67 R
(58) Field of Search ................................ 310/90, 67 R; 384/121; 360/99.08

(56) References Cited

U.S. PATENT DOCUMENTS 6,144,523 A * 11/2000 Murthy et al. ........... 360/99.08
6,181,039 B1 * 1/2001 Kennedy et al. ............... 310/90
6,394,654 B1 * 5/2002 Khan et al. ................. 384/114

* cited by examiner

Primary Examiner—Thanh Lam
(74) Attorney, Agent, or Firm—Moser, Patterson & Sheridan, LLP

(57) ABSTRACT

A method for setting a gap in a hydrodynamic bearing of a disc drive spindle motors and a motor having such a bearing gap. The method comprises mounting a rotor hub having a central journal sleeve onto a shaft that has been secured to a support after having had a lower thrust bearing pressed onto the shaft in communication with said support, adding an amount of hydrodynamic fluid into the rotor hub's journal sleeve, pressing an upper thrust bearing onto the rotor shaft until contact is made with the rotor hub, and rotating the hub until axial forces balance and set the bearing gap.

18 Claims, 6 Drawing Sheets

METHOD FOR SETTING GAPS IN HYDRODYNAMIC BEARINGS

CROSS-REFERENCE TO RELATED APPLICATION

This application is based on U.S. Provisional Application, Ser. No. 60/247,099, entitled "OPPOSED FDB FOR SETTING BEARING GAP", filed Nov. 9, 2000, by Herndon, et al., which is hereby incorporated by reference in its entirety.

FIELD OF THE INVENTION

The invention relates to the field of hydrodynamic bearings in electric motors. More specifically, the invention relates to a method for setting the gaps in the hydrodynamic bearings in electric motors utilized in a disk drive system.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle. The information is accessed by using read/write heads generally located on a pivoting arm that moves radially over the surface of the disc. The read/write heads or transducers must be accurately aligned with the storage tracks on the disc to ensure proper reading and writing of information.

During operation, the discs are rotated at very high speeds within an enclosed housing by using an electric motor generally located inside a hub that supports the discs. One type of motor in common use is known as an in-hub or in-spindle motor. Such in-spindle motors typically have a spindle mounted using two ball or hydrodynamic bearing systems to a motor shaft disposed in the center of the hub.

In a hydrodynamic bearing, a lubricating fluid such as air, gas or oil provides a bearing surface between two relatively rotating members, typically a shaft and surrounding sleeve. A volume containing the lubricating fluid is typically held between the hydrodynamic bearings. Each bearing is positioned proximate an end of the shaft and is spaced apart from the rotor hub by a small gap. To effectively form hydrodynamic bearings, the volume of fluid must be consistently and accurately formed. As such, the gap between the bearings and the rotor hub must be repeatable from disc drive to disc drive in the manufacturing process.

Therefore, there is a need in the art for a method that can accurately and repeatably set these gaps while allowing for high-speed assembly.

SUMMARY OF THE INVENTION

A method for setting a gap in a hydrodynamic bearing of a disc drive spindle motor is provided. The invention comprises mounting a rotor hub having a central journal sleeve onto a shaft that has been secured to a support after having had a lower thrust bearing pressed onto the shaft in communication with the support, adding an amount of hydrodynamic fluid into the rotor hub's journal sleeve, pressing an upper thrust bearing onto the rotor shaft until contact is made with the rotor hub, and rotating the hub until axial forces balance and set the air and fluid bearing.

While rotating, the rotor hub generates a pressure force that forces the hydrodynamic fluid disposed around the base of the shaft to move up the shaft. As the pressure force builds, a layer of air between the upper bearing and the fluid builds up pressure, the layer of air is forced between the upper shaft bearing and the rotor hub. The pressure forces the rotor hub to move until the air pressure equals the fluid pressure. This invention is especially useful in disc drive spindle motors, in that it provides a more efficient way of assembling a disc drive spindle motor because of the significant reduction of steps for manufacturing the prior art hydrodynamic bearings commonly found in disc drive spindle motors. Additionally, the invention may be useful for setting gaps in the hydrodynamic bearings of other types of motors. The invention can be used in both conical type hydrodynamic bearings and flat/thrust plate bearings.

BRIEF DESCRIPTION OF THE DRAWINGS

The teachings of the invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENTS

Figure 1:
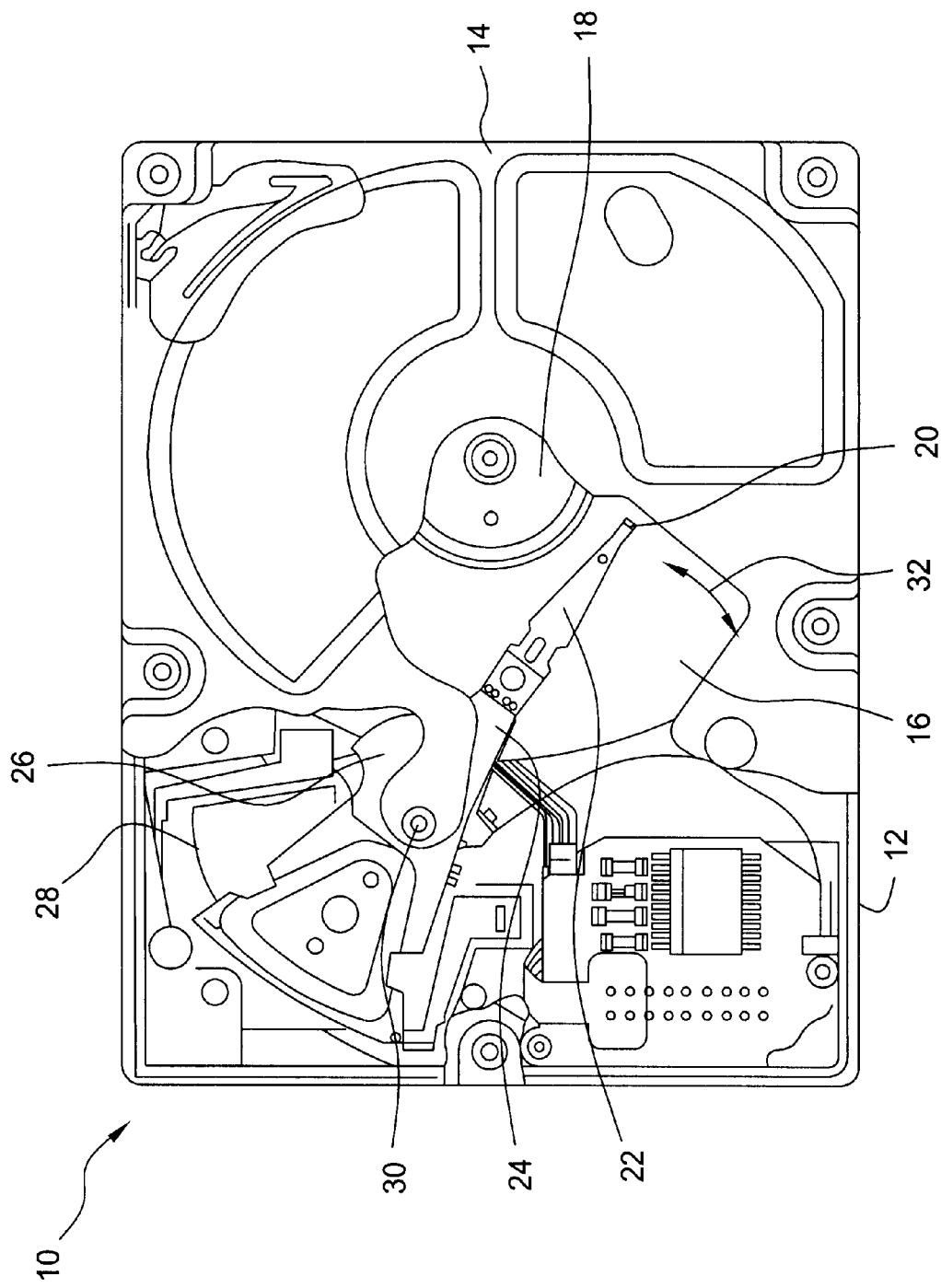
FIG. 1 is a top plan view of a disc drive, in accordance with the present invention.

The invention comprises a method for setting bearing gaps for hydrodynamic bearings in an electric motor. FIG. 1 is a plan view of a typical disc drive 10 wherein the invention is useful. The disc drive 10 comprises a housing base 12 and a top cover 14. The housing base 12 is combined with top cover 14 to form a sealed environment to protect the internal components from contamination by elements from outside the sealed environment.

The base and top cover arrangement shown in FIG. 1 is common in the industry. However, other arrangements of the housing components have been frequently used, and the invention is not limited to the configuration of the disc drive housing. For example, disc drives have been manufactured using a vertical split between two housing members. In such drives, that portion of the housing half that connects to the lower end of the spindle motor is analogous to base 12, while the opposite side of the same housing member, that is connected to or adjacent the top of the spindle motor, is functionally the same as the top cover 14.

The disc drive 10 further comprises a disc pack 16 that is mounted for rotation on a spindle motor (not shown) by a disc clamp 18. The disc pack 16 includes one or more of individual discs that are mounted for co-rotation about a central axis. Each disc surface has an associated head 20 for communicating with the disc surface. In the example shown in FIG. 1, heads 20 are supported by flexures 22 that are in turn attached to head mounting arms 24 of an actuator body 26. The actuator body 26 shown in FIG. 1 is of the type known as a rotary moving coil actuator and includes a voice coil motor (VCM), shown generally at 28. The voice coil motor 28 rotates the actuator body 26 with its attached heads 20 about a pivot shaft 30 to position the heads 20 over a desired data track along an arcuate path 32. While a rotary actuator is illustratively shown in FIG. 1, the invention is also useful in disc drives having other types of actuators, such as linear actuators.

Figure 2:
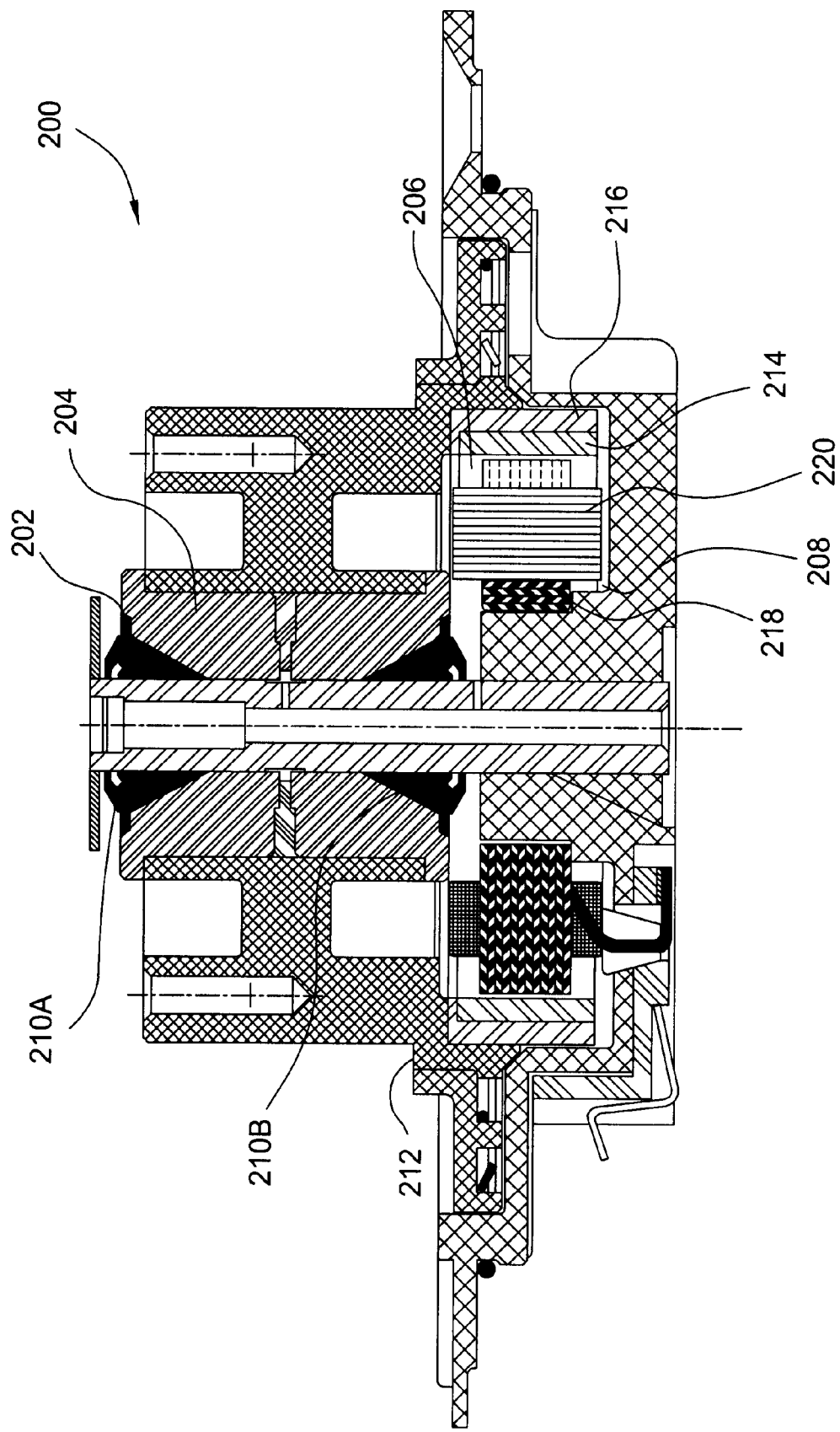
FIG. 2 is a sectional view of an isolated hydrodynamic bearing spindle motor in accordance with the present invention.

FIG. 2 is a sectional view of a hydrodynamic bearing spindle motor 200. The spindle motor 200 includes a stationary shaft 202, a hub 204 and a stator 206. The shaft 202 is fixed and attached to a base 208. The hub 204 is supported by the shaft 202 through bearings 210A and 210B for rotation about the shaft 202. The bearings 210A and 210B are, for example, hydrodynamic bearings.

The bearings 210A and 210B depicted in FIG. 2 are conical type hydrodynamic bearings as contrasted to the "flat plate" or "thrust" design as illustrated in FIG. 3. The present invention covers both designs, and as such, both designs have been represented.

The hub 204 includes a disc carrier flange 212 that supports a disc pack (not shown) for rotation about the shaft 202. The disc pack is held on the disc carrier flange 212 by a disc clamp (not shown). A plurality of permanent magnets 214 are attached to a first inner surface 216 of the hub 204, with the hub 204 and the magnets 214 acting as a rotor for the spindle motor 200.

The stator 206 is generally formed of a stack of stator laminations 218 that form a plurality of stator "teeth" that are each wound with an associated stator winding 220. The stator 206 is generally retained in the base 208 by fasteners, adhesives or other conventional methods.

In accordance with the invention, the hub 204 is initially assembled without any air gaps between the hub 204 and the bearings 210A and 210B. The invention sets the air gap. The invention may be practiced regardless of the hydrodynamic bearing type specified.

Figure 3A:
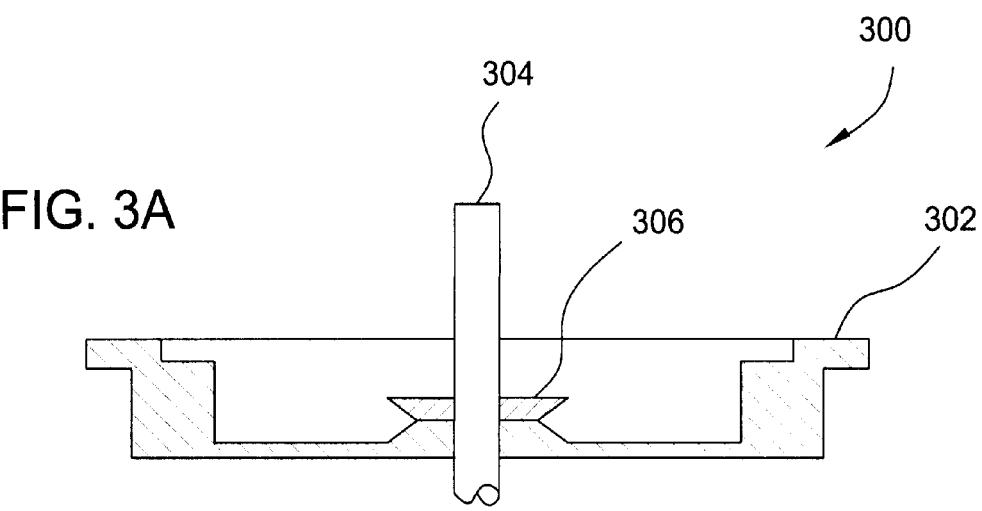
FIGS. 3A–3F are a series of sectional motor assembly views of a sequence of steps to set bearing gaps in an electric motor according to the present invention.
Figure 3B:
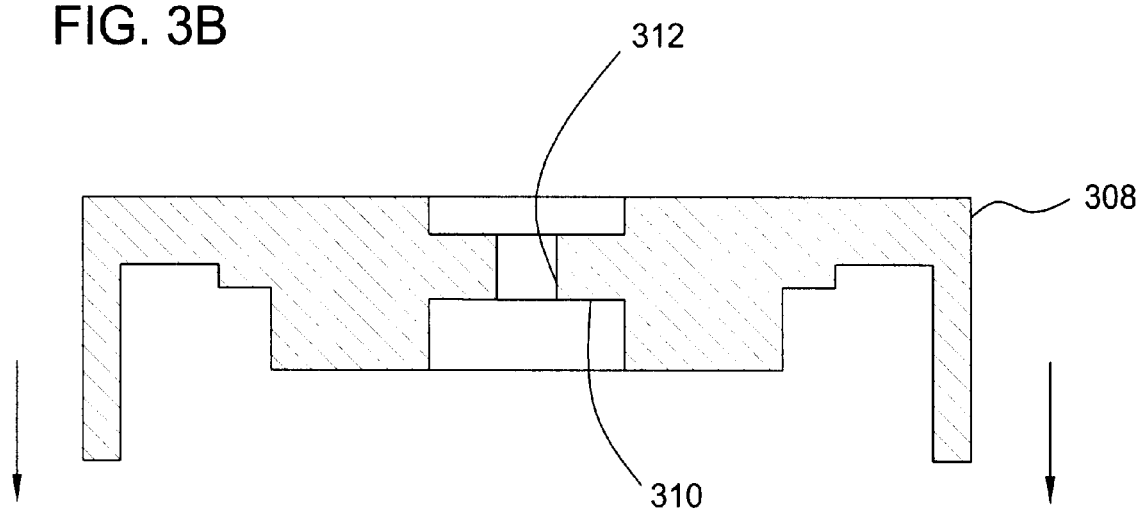
Figure 3B:
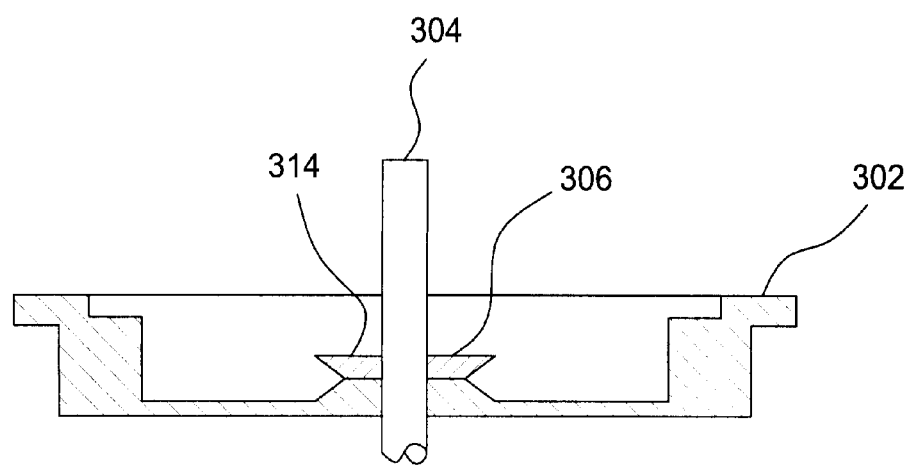
Figure 3C:
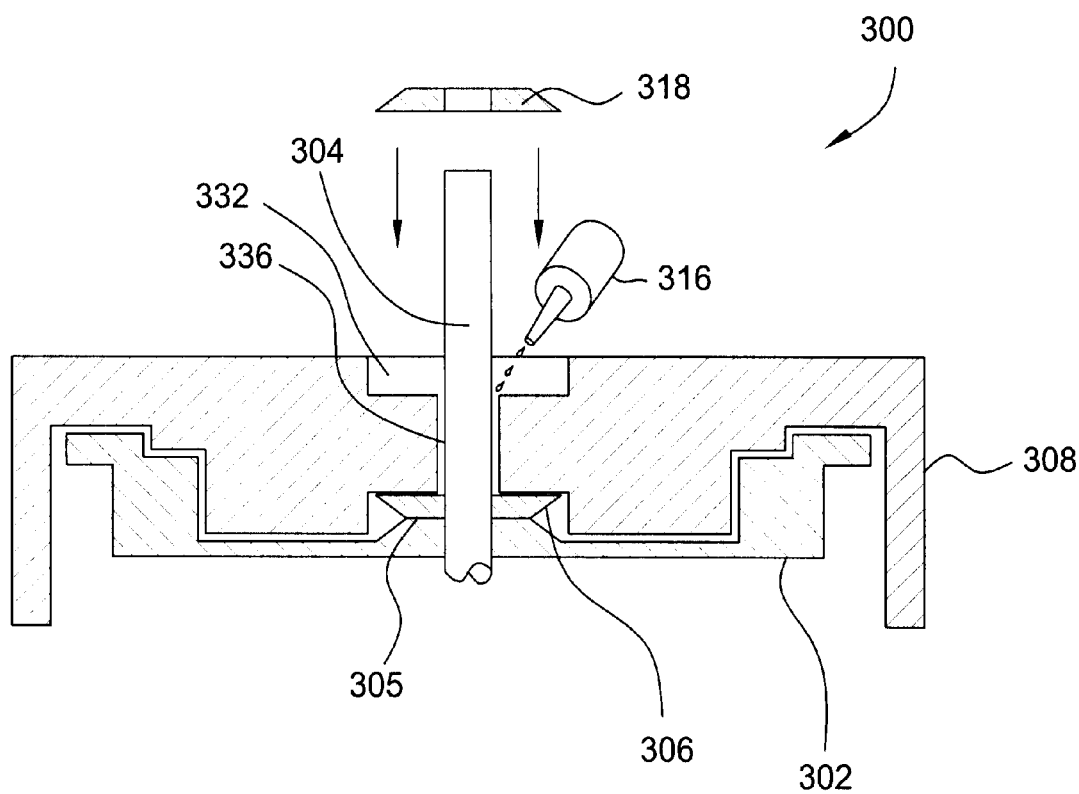
Figure 3D:
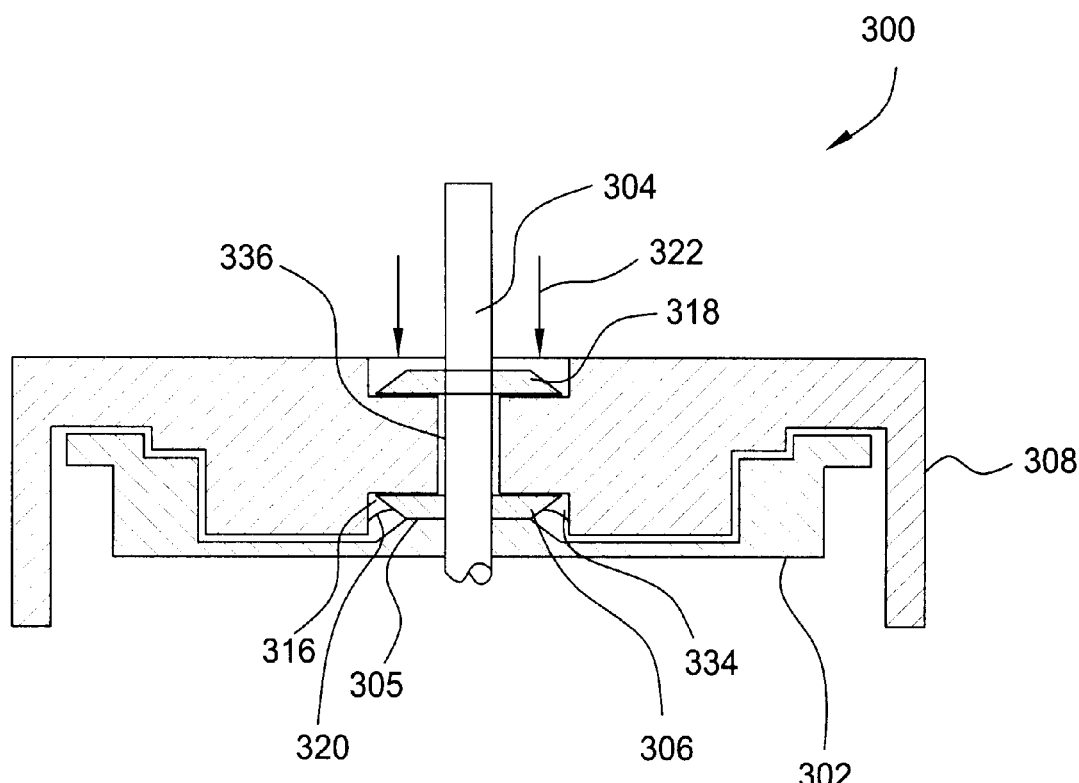
Figure 3E:
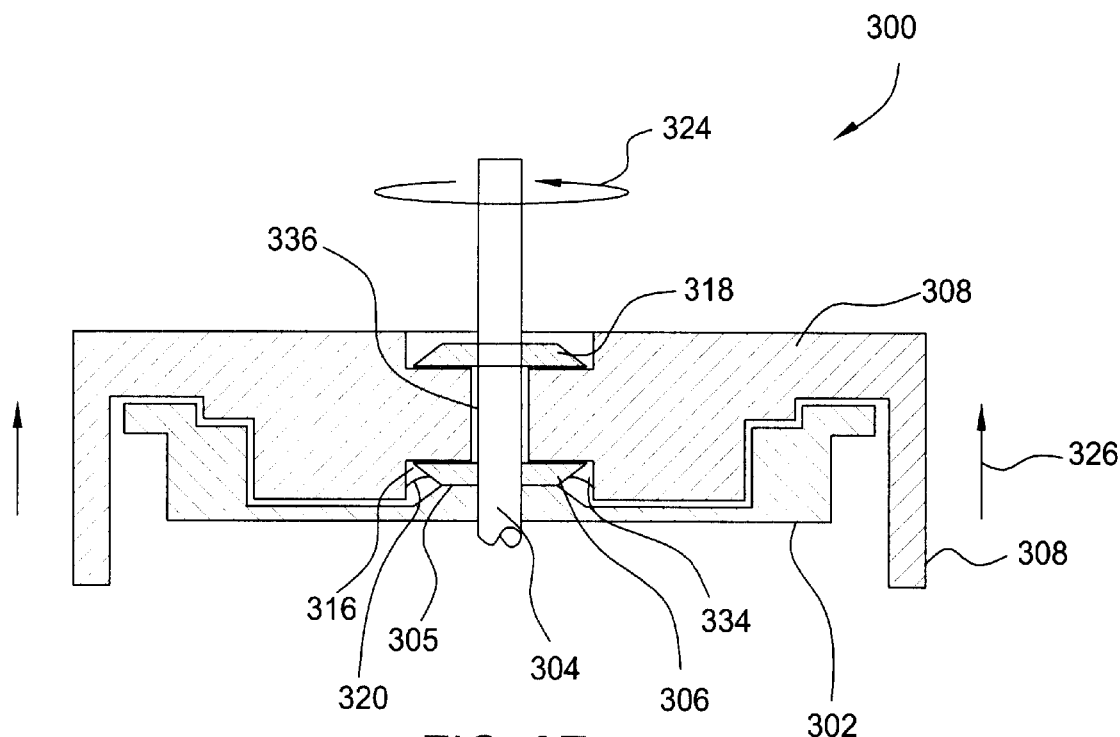
Figure 3F:
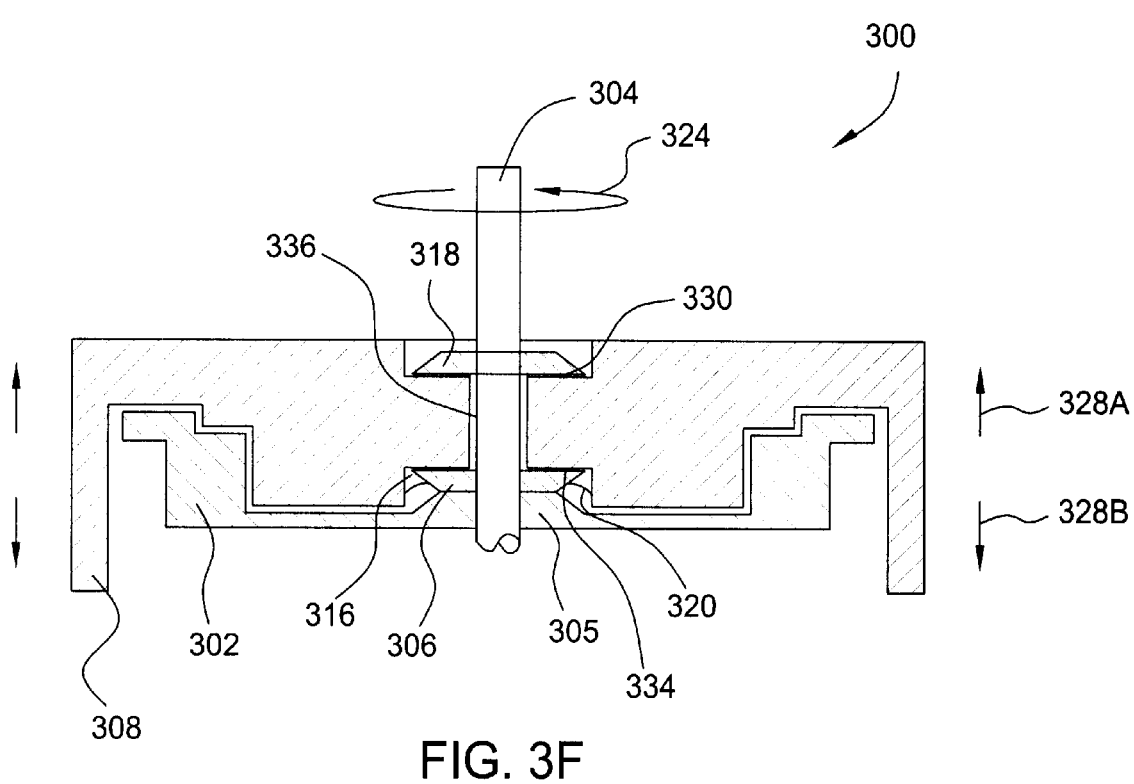
Figure 4:
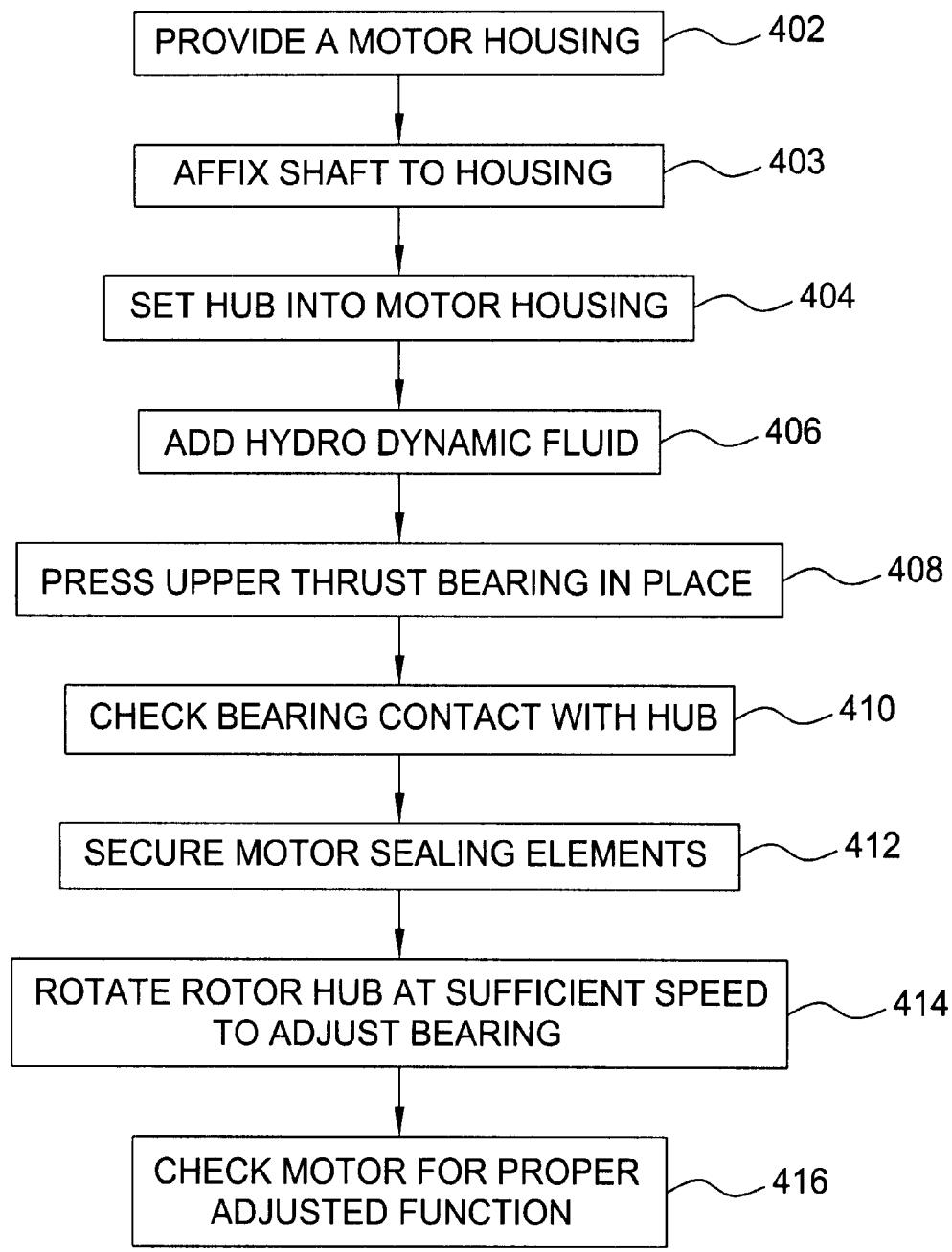
FIG. 4 is a flow chart of the steps required to set bearing gaps in an electric motor according to the present invention.

The reader may find it useful to simultaneously refer to FIGS. 3 and 4. FIGS. 3A–3E are a series of sectional views of the assembly process according to the present invention. This series has been simplified in order to emphasize the unique features of the present invention. The series as such depicts only the necessary elements needed to fully describe the present invention. FIG. 4 is a flow chart representing a method 400 of motor assembly and setting of gaps in the hydrodynamic bearings of an electric motor according to the present invention.

The first step in the method for setting gaps in hydrodynamic bearings begins with FIG. 3A. The assembly process 400 begins by providing a motor housing in step 402.

FIG. 3A depicts a rotor hub support housing 302. Those skilled in the art will appreciate that a rotor hub support housing 302 may comprise a range of elements from the essential components necessary to support a rotor hub to the entire assembly surrounding the entire motor. FIG. 3A depicts the rotor hub support 305 in communication with elements of a shaft 304 and a lower thrust bearing 306. Typically, a shaft 304 is mounted or affixed, at step 403, to a rotor hub support 305 by conventional methods such as press fitting or use of fasteners, epoxy, etc., while the lower thrust bearing is generally press-fit into place, although other arrangements may be used.

FIG. 3B depicts, at step 404, a progression in the assembly process 400 wherein a rotor hub 308 is aligned coaxially with the center of the shaft 304 and affixed onto the shaft 304 such that the lower recess 310 of the rotor hub 308 rests on the lower thrust bearing 306. The bearing face 314 of the lower thrust bearing 306 is perpendicular to the shaft 304, while the body of the lower thrust bearing 306 is coaxially aligned with the central axis of the shaft 304. The journal sleeve 314 of the rotor hub 308 acts as a fluid transmission conduit as well as an axial bearing surface.

Once the rotor hub 308 is seated on the lower thrust bearing 306, a hydrodynamic fluid 316, at step 406, is deposited into the rotor hub 308 before the upper thrust bearing 318 is installed. The fluid 316 is placed into the rotor hub's journal 312 where it flows down around the lower thrust bearing 306 and forms a meniscus 320 between the rotor hub 308 and the lower thrust bearing 306.

After the hydrodynamic fluid 316 has been added, the upper thrust bearing 318 is ready to be installed at step 408. The upper thrust bearing 318 is aligned coaxial with the shaft 304 and press fit into an upper recess 332 formed in the top of the rotor hub 308 as shown in FIG. 3D. No gap is left between the top of the rotor hub 308 and the upper thrust bearing plate 318, however, a gap 334 does exist between the rotor hub 308 and the lower thrust bearing 306. The gap 334 is a fluid gap where hydrodynamic fluid 316 has accumulated via capillary action after having been added in FIG. 3C. The fluid gap 334 may be set or adjusted by conventional methods such as tooling, etc., and is set within the range of 0.003 mm to 0.02 mm. The present invention focuses on setting an upper air bearing gap 330 between the rotor hub 308 and the upper thrust bearing plate 318. After the upper thrust bearing plate 318 has been set, the fit between the rotor hub 308 and the thrust bearing plate 318 is checked to make certain contact is achieved as noted in step 410 of FIG. 4.

The upper air bearing gap 330 is not created until the rotor hub 308 is rotated at the normal operating speed of the motor during use (known as duty cycle speed). Hub rotation is denoted in FIG. 3E and FIG. 3F as arrow 324. Before being rotated, the unit is assembled as a complete motor as noted in step 412 of FIG. 4. (Illustrations of a completed motor assembly have been omitted from the FIG. 3 series for clarity.) At step 414, the rotor hub 308 is rotated about the shaft 304 to pressurize the hydrodynamic fluid 316. The pressure may vary from a few pounds per square inch gas (PSIG) to multi-hundreds of PSIG (gauge pressure). The pressurized hydrodynamic force generated creates an air gap 330 that forms between the upper thrust plate 318 and the rotor hub 308. The rotor hub 308 will ride at a gap between the lower thrust bearing 306 and the upper thrust bearing 318 where the axial forces shown by arrows 328A and 328B are balanced. Typically, in order for an air bearing gap to generate enough equal and opposite force to counteract the axial force generated by the hydrodynamic fluid riding on the bottom thrust bearing, the upper thrust bearing 318 will have to ride at less than a 0.001 mm gap. The motor is checked in step 416 for proper adjusted function.

Once balanced, there are three translational axis of freedom. Two of the axis'absolute motion are constrained by the journal gap size 336, while the axial absolute movement is constrained by the thrust gaps 330 and 334 as seen in FIG. 3F.

Although various embodiments which incorporate the teachings of the present invention have been shown and described in detail herein, those skilled in the art can readily devise many other varied embodiments that still incorporate these teachings.

What is claimed is:

1. An electric motor comprising:
   a base;
   a shaft having a first end affixed to the base;
   a first thrust bearing affixed to the shaft;
   a rotor hub rotatably positioned on said shaft and supported on said first thrust bearing;

a second thrust bearing affixed to the shaft;

a fluid located proximate the shaft and first thrust bearing to form, when the rotor hub rotates, a hydrodynamic bearing between the rotor hub and the first thrust bearing and an air bearing between the second thrust bearing and the rotor hub, the shaft being of smaller diameter than the first and second thrust bearings.

2. A motor as claimed in claim 1 wherein the thrust bearings are planar.

3. A motor as claimed in claim 2 further comprising a disc pack supported on an outer surface of the rotor.

4. A motor as claimed in claim 1 wherein the thrust bearings are conical.

5. A motor as claimed in claim 4 further comprising a disc pack supported on an outer surface of the rotor.

6. A motor as claimed in claim 1 wherein the air bearing is distal from the base.

7. A motor as claimed in claim 6 wherein the air thrust bearing comprises a gap of less than 0.001/min.

8. A motor as claimed in claim 6 wherein the air thrust bearing comprises a gap of less than 0.001/min.

9. A motor as claimed in claim 1 wherein the thrust bearings are conical.

10. A fluid bearing system comprising a shaft, a sleeve rotating around the shaft, the system comprising first and second thrust bearings separated from each other along the shaft, each of the thrust bearing comprising a surface facing a surface of the sleeve, one of the thrust bearings comprising an air bearing, and the other of the bearings comprising a hydraulic bearing.

11. A fluid bearing system as claimed in claim 10 wherein the air bearing is distal from the base.

12. A motor as claimed in claim 10 wherein the thrust bearings are planar.

13. In a spindle motor for a disc drive including a hub supporting one or more discs for rotation about a central axis and shaft of a motor, the shaft and a sleeve surrounding the shaft and supporting the hub on an outer surface thereof for rotation around the shaft defining a gap between the shaft and the surrounding sleeve, the sleeve being supported for rotation relative to the shaft by a fluid bearing system comprising first and second thrust bearings supported on the shaft and separated by the shaft, each of the thrust bearings comprising a thrust bearing element having a surface facing a cooperating surface of the sleeve, one of the thrust bearing having a fluid in a gap between the surface of the thrust bearing element and the cooperating surface of the sleeve, the other of the thrust bearings including air in a gap between the surface of the thrust bearing element and the sleeve.

14. A motor as claimed in claim 13 wherein the first and second thrust bearing surfaces are planar.

15. A motor as claimed in claim 13 wherein the thrust bearing surfaces are conical.

16. A motor as claimed in claim 13 wherein the thrust bearing comprising air in the gap is less than 0.001 mm.

17. A motor as claimed in claim 16 wherein the motor is arranged so that the air thrust bearing surface rests on the corresponding external surface of the sleeve when the system is at rest.

18. A motor as claimed in claim 17 wherein the air thrust bearing comprises a gap of less than 0.001 mm.

* * * * *